US011939142B2

(12) United States Patent
Tottone et al.

(10) Patent No.: US 11,939,142 B2
(45) Date of Patent: Mar. 26, 2024

(54) CAPSULE FOR THE PREPARATION OF A COFFEE-BASED BEVERAGE

(71) Applicant: LUIGI LAVAZZA S.P.A., Turin (IT)

(72) Inventors: Fabio Tottone, Turin (IT); Luca Bugnano, Turin (IT); Emilio Cugnetto, Turin (IT); Luisa Borello, Turin (IT); Silvia Barus, Turin (IT); Alberto Cabilli, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 680 days.

(21) Appl. No.: 17/251,594

(22) PCT Filed: May 31, 2019

(86) PCT No.: PCT/IB2019/054547
§ 371 (c)(1),
(2) Date: Dec. 11, 2020

(87) PCT Pub. No.: WO2019/239248
PCT Pub. Date: Dec. 19, 2019

(65) Prior Publication Data
US 2021/0253336 A1    Aug. 19, 2021

(30) Foreign Application Priority Data

Jun. 12, 2018  (IT) .......................... 102018000006242

(51) Int. Cl.
*B65D 85/804*  (2006.01)
*A47J 31/36*  (2006.01)
(Continued)

(52) U.S. Cl.
CPC ...... *B65D 85/8043* (2013.01); *A47J 31/3695* (2013.01); *A47J 31/468* (2018.08);
(Continued)

(58) Field of Classification Search
CPC ............. B65D 85/8043; B65D 85/8067; A47J 31/469; A47J 31/468; A47J 31/3695
(Continued)

(56) References Cited

U.S. PATENT DOCUMENTS

| 2010/0129512 A1* | 5/2010 | Accursi | ............... | A47J 31/0673 |
|---|---|---|---|---|
| | | | | 99/302 R |
| 2014/0079855 A1* | 3/2014 | Yokoo | ................ | B65D 85/8043 |
| | | | | 426/432 |

(Continued)

FOREIGN PATENT DOCUMENTS

| CN | 201086952 | 7/2008 |
|---|---|---|
| JP | 2012-530521 A | 12/2012 |
| JP | 2013-540026 A | 10/2013 |
| WO | 2010137945 | 12/2010 |

(Continued)

OTHER PUBLICATIONS

Office Action dated Feb. 14, 2023, issued in Japan Patent Application No. 2020-563766, 3 pages.

*Primary Examiner* — Omar Flores Sanchez
(74) *Attorney, Agent, or Firm* — Nixon & Vanderhye P.C.

(57) ABSTRACT

A capsule for extraction of a beverage of the filter-coffee type has a capsule body (2), made of water-impermeable material, which defines a chamber (3), present inside which is a precursor of the beverage, comprising soluble coffee and roast and ground coffee. At least 51 wt % of the precursor is roast and ground coffee having a grain size expressed in x50 comprised between 350 and 800 μm, and the complement to 100 wt % of the precursor is soluble coffee having a grain size expressed in x50 comprised between 1000 and 5000 μm. The roast and ground coffee is laid out to form a first layer (GC) in the lower part of the capsule body (3), and the soluble coffee (SC) is laid out to form a second layer (SC) in the upper part of the capsule body, i.e., in a position corresponding to the inlet wall (5) and/or above the first layer (GC). The first layer of roast and ground coffee (GC)

(Continued)

is pressed inside the capsule body (3), and the second layer of soluble coffee (SC) is present inside the capsule body (3) substantially unpressed.

20 Claims, 6 Drawing Sheets

(51) Int. Cl.
  *A47J 31/46* (2006.01)
  *B65B 29/02* (2006.01)
(52) U.S. Cl.
  CPC .......... *A47J 31/469* (2018.08); *B65B 29/022* (2017.08); *B65D 85/8067* (2020.05)
(58) Field of Classification Search
  USPC .......................................... 99/295
  See application file for complete search history.

(56) References Cited

U.S. PATENT DOCUMENTS

| | | | |
|---|---|---|---|
| 2015/0158609 A1* | 6/2015 | Villain | B65B 31/028 |
| | | | 426/112 |
| 2016/0192806 A1* | 7/2016 | Pikkemaat | A47J 31/407 |
| | | | 426/433 |
| 2018/0344071 A1* | 12/2018 | Sachtleben | A47J 31/468 |
| 2020/0000266 A1* | 1/2020 | Melrose | A47J 31/4403 |
| 2021/0347547 A1* | 11/2021 | Vidal | B32B 27/12 |
| 2022/0017294 A1* | 1/2022 | Footz | B65D 85/8052 |
| 2022/0348401 A1* | 11/2022 | Frank | C23G 1/02 |
| 2023/0121591 A1* | 4/2023 | Kroes | A23J 1/125 |
| | | | 426/570 |

FOREIGN PATENT DOCUMENTS

| | | |
|---|---|---|
| WO | 2012055751 | 5/2012 |
| WO | 2016145007 | 9/2016 |
| WO | 2018024587 | 2/2018 |

* cited by examiner

CAPSULE FOR THE PREPARATION OF A COFFEE-BASED BEVERAGE

This application is the U.S. national phase of International Application No. PCT/IB2019/054547 filed May 31, 2019 which designated the U.S. and claims priority to IT Patent Application No. 102018000006242 filed Jun. 12, 2018, the entire contents of each of which are hereby incorporated by reference.

TECHNICAL FIELD

The present invention relates in general to the systems for the preparation of coffee-based beverages and has been developed with particular reference to capsules containing precursors of the above beverages.

PRIOR ART

Various systems for the preparation of coffee-based beverages, whether of a domestic type or of a vendor-machine type, basically consist of two sub-systems, designed to co-operate so as to obtain a beverage for human consumption.

The first sub-system is constituted by a plurality of capsules (or cartridges, according to another term currently in use), which in general include a wrapper made of a material that is impermeable to fluids, designed to contain the precursor of the beverage, for example roast and ground coffee, or else soluble coffee.

The second sub-system is instead constituted by a so-called "coffee machine", i.e., an electro-mechanical apparatus designed to receive the aforesaid capsules and enable brewing of the beverage, even under pressure.

A typical coffee machine of this type has a hydraulic circuit that includes at least a pump, a boiler, and an infusion or brewing unit ("brewing unit", according to current Anglo-Saxon terminology) within which a capsule containing the precursor of the beverage to be prepared is each time loaded.

Figure 1:
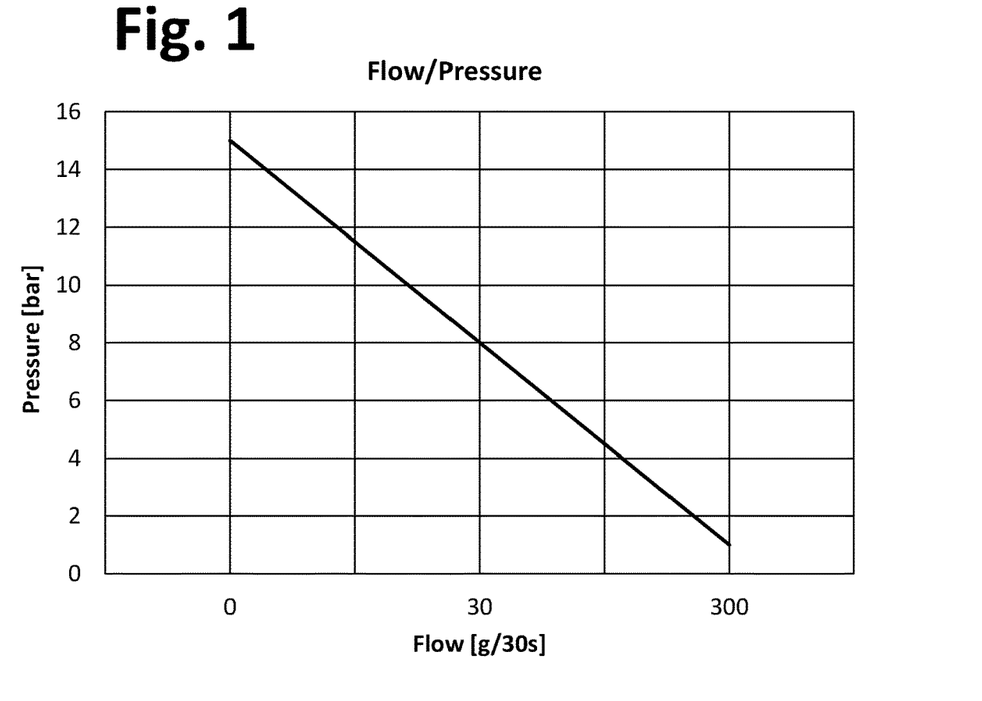
FIG. 1 is a simplified pressure-vs.-flow graph aimed at exemplifying the characteristic operating curve typical of the pump of a generic capsule-type coffee machine, having a fixed-volume preparation chamber.

FIG. 1 is a pressure-vs.-flow graph that exemplifies the typical operating characteristics of a pump for coffee machines of the type considered herein. The work point of the pump is obtained as the intersection between the hydraulic characteristic of the pump and that of the capsule inserted in the machine itself, i.e., in its hydraulic circuit. Deriving from this are different flows and pressures and, in the final analysis, different chemical-physical characteristics of the extracted beverage.

The majority of brewing units of coffee machines present on the market are distinguished by the fact that they have a chamber for housing the capsule that has a fixed volume: this implies that the geometry and constructional characteristics of the corresponding capsules must also be defined in the stage of design of the machine. This circumstance represents an element of considerable commercial rigidity in so far as the dimensions and the associated mode of operation of the capsule must remain substantially unchangeable for that particular type of machine: in other words, for a producer of the "machine+capsules" system, it will not be possible to launch on the market new capsules having dimensions different from the ones initially proposed, other than by developing new machines suited to receiving the aforesaid new capsules. It would certainly be possible to provide coffee machines having a brewing unit pre-arranged for defining a housing chamber with variable volume, so as to be able to receive inside it capsules of different dimensions and/or formats: this would involve, however, a significant increase in the constructional and operating complexity of the machine, as well as in its costs.

Figure 2:
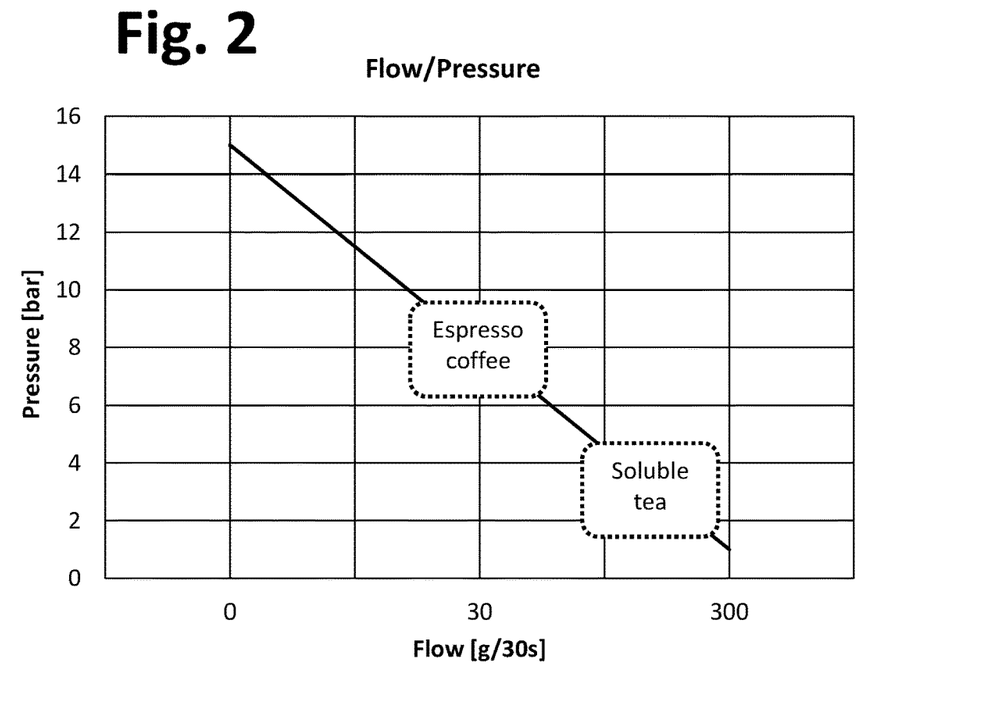
FIG. 2 is a graph similar to that of FIG. 1, highlighted in which are two typical operating conditions, represented by preparation of an espresso coffee and a soluble tea, respectively.

On the above bases, coffee machines commonly available on the market thus have a brewing unit with a fixed-volume chamber and their hydraulic circuit is substantially designed so as to be able to deal with two "limit" conditions of use, in terms of flows/pressures. To clarify this aspect more fully, FIG. 2 exemplifies the work points of the two types of capsules currently available on the market, which, on account of their operating characteristics, represent the two aforesaid limit conditions, namely:

i) a capsule of an "espresso coffee" type, i.e., one that is to undergo extraction with a typical water/coffee contact time of approximately 30 s for 30 g, at typical pressures of approximately 8 bar, with a concentration of approximately 5-8° Bx (Brix) and extraction percentage comprised between approximately 18% and 24%;

ii) a capsule of the "soluble tea" type, i.e., one that is to undergo extraction at low pressure and with high flow.

The unit of measure degrees Brix (° Bx) expresses the amount of the substances in the solid state dissolved in a liquid, whereas by "extraction percentage" is meant the percentage ratio between the dry residue of the beverage (i.e., the weight of the residue obtained after desiccation of the beverage at a temperature of 103° C. until the weight remains constant) and the weight of the roast and ground coffee used for the preparation.

The capsules designed for operating with a given coffee machine with fixed-volume brewing chamber must have dimensions such as to enable alternative housing of a brewing precursor or a soluble precursor, namely:

i) an amount of coffee useful for extracting a dose of espresso coffee, which is typically comprised between 5 and 10 g of roast and ground coffee for a dose of beverage of between 30 and 40 g; or else ii) an amount of powder of soluble product designed to obtain beverages like tea, re-hydrated powdered milk, ginseng, etc., in indicative doses of 80-150 g of beverage.

In the most widespread cases, the useful volume of such capsules is comprised between 15 and 30 $cm^3$, and their geometry is substantially frustoconical.

There exists at least one further very widespread type of coffee-based beverage, i.e., the liquid product known as "filter coffee", which is widely consumed in Northern Europe, the United States, and Canada. Filter coffee is a ground-coffee-based beverage that is typically obtained via percolation, i.e., getting the ground coffee to be traversed by an abundant flow of hot water, in the absence of pressure or with only modest pressure, according to whether the beverage is prepared manually or else using a percolator. The ground coffee can be withheld by an appropriate filter or else be contained in a large filter-paper pod.

Filter coffee typically presents the following characteristics:
- dose of beverage: 150-300 g;
- extraction pressure: 0-1 bar approx.;
- extraction time: 60 s approx.;
- dose of roast and ground coffee powder: 9-14 g;
- concentration: 1-1.5° Bx approx.;
- extraction percentage: 18%-24% approx.

The table below sums up the typical values of espresso coffee, soluble tea, and filter coffee so far considered.

TABLE 1

|  | Espresso coffee | Soluble Tea | Filter Coffee |
| --- | --- | --- | --- |
| Dose of beverage | 30-40 g | 90-150 g | 150-300 g |
| Dose of precursor | 5-10 g | variable | 9-14 g |
| Grain size (×50) | 250-350 μm | variable | 400-800 μm |
| Densification via mechanical pressing | yes | no | no |
| Extraction pressure | 5-10 bar | 0-2 bar | 0-1 bar |
| Brewing time | 30 s | 30 s | 60 s |
| Degrees Brix | 5-9° Bx | variable | 1-1.5° Bx |
| Extraction percentage | 18-22% | 100% | 18-22% |

In order to provide a greater benefit for the consumer there arises the need to increase the number of possible coffee-based beverages that can be brewed with a pre-existing capsule-based system, i.e., to extend the aforesaid potential for the benefit of the consumer also to preparation of a beverage of a filter-coffee type, or distinguished by an organoleptic result that is similar to that of filter coffee. As explained above, this should be done without increasing the dimension of the capsule in order to prevent:

having to increase excessively the filling weight in the case of capsules for espresso coffee, thus generating beverages that are excessively concentrated and strong; and having to develop, and subsequently market, coffee machines with different cavities for housing capsules of different dimensions, one for each type of precursor of coffee-based beverage (espresso coffee, soluble coffee, filter coffee).

As explained previously, coffee machines with fixed-volume chamber that are usually available on the market are conceived for managing the two "extremes" represented by preparation of espresso coffee and preparation of soluble tea. It will be appreciated, however, that the provision of capsules that are able to deliver a dose of beverage with a result in the cup that is similar to that of filter coffee, which respect acceptable levels of quality and taste, may be difficult to achieve in a system typically designed for operating with capsules for espresso coffee and capsules for completely soluble precursors.

Mixing of ground coffee and soluble coffee in a capsule or cartridge has already been proposed in the past, but with relatively large volumes of the two components, which are often mixed directly together.

The same present Applicant has experienced the result of mixing roast and ground coffee with coffee of a soluble or instant type (both of a "freeze dry" type and of a "spray dry" type), where:

by "roast and ground coffee" is meant the primary product of roasting of ground raw coffee; this product has not yet undergone aqueous extraction;

by "soluble coffee" or "instant coffee" is meant the dry residue of the infusion of coffee without the aqueous components, from which it is possible, by adding water, to reconstitute a beverage, the only ingredient of which, apart from water, is coffee.

In the combination of the two types of coffee in question the soluble component comes to assume the function—given its high yield per fluid beverage unit (extraction percentage of at least 50%) and given the relatively limited volume of the brewing chamber for the capsule (not more than 30 cm$^3$)—of making it possible, with a reduced amount in weight, to extend the dose of beverage beyond 150 g, up to 300 g. The roast and ground coffee assumes, instead, the function of intervening at an organoleptic level, reducing the typical taste of the soluble component and restoring the taste so that it resembles that of classic filter coffee.

In the course of the experiments conducted by the present Applicant, the capsules were tested on standard coffee machines, of the type referred to previously, which are suitable for preparing espresso coffee and soluble tea. In the course of this testing stage, there were encountered, with a high frequency, anomalous and random cases of technical failure (i.e., of machine operation considered unacceptable), where the pressure in the capsule increased considerably with respect to the design value (approximately 1 bar), consequently determining work points very distant from the typical condition envisaged for a beverage of a filter-coffee type. This concept is represented schematically in the pressure-vs.-flow graph of FIG. 3, highlighted in which are the expected work point for preparation of a beverage of a filter-coffee type and the work point corresponding to a typical anomalous event of machine operation, distinguished by a considerable increase in pressure (indicatively, approximately 5 bar) within the capsule. Such an anomalous event is evidently unacceptable both from a functional standpoint and from an organoleptic standpoint in so far as:

the consumer has to wait a long time to obtain a cup containing a beverage having an organoleptic result that is similar to that of filter coffee corresponding to a dose of approximately 150-300 g; and as a consequence of the very high pressure and very long contact time, the taste and organoleptic profile of the resulting beverage varies significantly from the expected one.

The non-systematic nature of these anomalous operating events, and hence the non-controllability of the process, further complicate the situation.

AIM AND SUMMARY

In its general terms, the present invention has the aim to overcome the drawbacks linked to the occurrence of anomalous events of the type referred to. In this context, the invention has the aim to provide a capsule that has a simple structure, is inexpensive and reliable, and is designed to enable preparation of a beverage of a filter-coffee type, or distinguished by a taste and/or an organoleptic result that are/is similar to that of filter coffee and presents an adequate quality, even when obtained using coffee machines designed principally for operating with capsules suited for the preparation of espresso coffee and capsules that are designed to obtain beverages starting from soluble precursors. Another aim of the invention is to make it possible to obtain a beverage of the type referred to that is of satisfactory quality using capsules that contain a relatively limited overall amount of the precursor, in particular a total amount not higher than approximately 12 g, preferably not higher than 10 g.

These and other aims still, which will emerge clearly hereinafter, are achieved, according to the present invention, by a capsule for the preparation of a coffee-based beverage having the characteristics specified in the annexed claims, which form an integral part of the technical teaching provided herein in relation to the invention.

Likewise forming a subject of the invention is a method for obtaining such a capsule, and a system for the preparation of beverages that uses such a capsule.

BRIEF DESCRIPTION OF THE DRAWINGS

Further aims, characteristics, and advantages of the invention will emerge clearly from the ensuing detailed description, with reference to the annexed drawings, which are provided purely by way of non-limiting example and in which.

DESCRIPTION OF PREFERRED EMBODIMENTS

Reference to an embodiment in the framework of the present description is intended to indicate that a particular configuration, structure, or characteristic described in relation to the embodiment is comprised in at least one embodiment. Hence, phrases such as "in an embodiment", "in one embodiment", "in various embodiments", and the like, that may be present in various points of this description, do not necessarily refer to one and the same embodiment. Moreover, particular conformations, structures, or characteristics defined in this description may be combined in any adequate way in one or more embodiments, even different from the ones represented. The reference numbers and spatial references (such as "upper", "lower", "top", "bottom", etc.) used herein are provided merely for convenience and hence do not define the sphere of protection or the scope of the embodiments. In the figures, the same reference numbers are used for designating elements that are similar or technically equivalent to one another.

Figure 4:
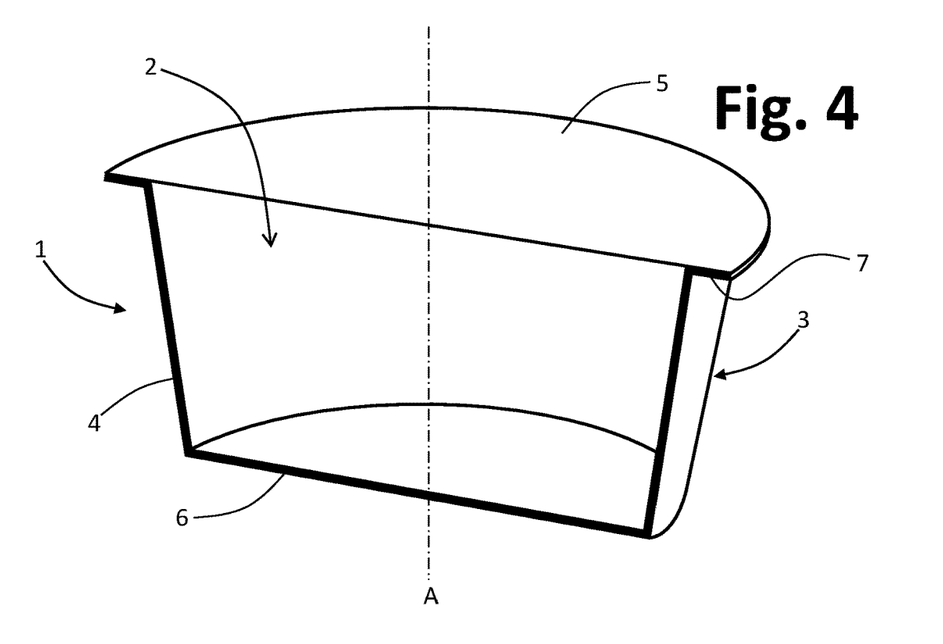
FIG. 4 is a schematic and sectioned perspective view of a capsule according to possible embodiments of the invention, without the corresponding contents.

FIG. 4 illustrates, by way of example, the general structure of a capsule (or cartridge, according to another term currently in use) suitable for implementation of the present invention. The capsule, designated by 1, defines a chamber 2 that is to contain a dose of a precursor, which is able to form a liquid product using water and/or steam. In various embodiments, the chamber 2 has a volume comprised between 15 cm$^3$ and 30 cm$^3$, preferably between 17.20 cm$^3$ and 26.90 cm$^3$. As will be seen, in the case considered herein, the precursor comprises two different substances, and in particular soluble coffee and roast and ground coffee, both in powder form.

The structure of the capsule 1 is as a whole shaped substantially like a tray or small cup, and comprises a body 3 with a peripheral or circumferential wall 4, a top 5, and a bottom 6. In the example, the top 5 and the bottom 6 are generally transverse walls—here defined merely for simplicity also as "upper wall" and "lower wall"—that close the body 3 axially at the opposite ends of the circumferential wall 4.

In various embodiments, the capsule 1 is a hermetically sealed capsule, with an upper wall 5 that is constituted by a film of sealing foil, whereas the lower wall 6 is unperforated (without openings) and is made of a single piece with the circumferential wall 4. This does not, however, constitute an essential characteristic, in so far as also the lower wall could be configured as a part distinct from the body 3, for example in the form of a foil or bottom applied to a body 3 open underneath.

In various embodiments, the body 3 is generally semi-rigid, is made of water-impervious material, and preferably presents barrier properties in regard to oxygen and moisture, for example an injection-mouldable or thermoformable plastic material; not, however, excluded from the scope of the invention is formation of the body 3 using an aluminium-based material or a material of a compostable type. The film that forms the wall 5 is preferably constituted by a material consisting of a flexible, possibly multilayer, foil, which is in particular, though not exclusively, aluminium-based. Also the body 3 may have a layered structure.

The wall 5 is secured, for example via heat-sealing or gluing, to the wall 4 at an upper annular flange 7 thereof, which surrounds the mouth part of the body 3 and extends in a transverse direction outwards with respect to a central axis A of the capsule 1, at the upper end of the wall 4. The capsule 1 hence has a shape asymmetrical with respect to a plane passing through the flange 7. In the example, since the capsule 1 is a sealed capsule, the foil that forms the wall 5 is impermeable and secured in a sealed way to the flange 7, at least at the upper surface of the latter.

In the case exemplified, the body 3 is shaped like a cup or tray diverging from the bottom 6 towards the end closed by the foil 5. Preferentially, the aforesaid divergent conformation is substantially frustoconical; however, this is not imperative in so far as the capsule 1 may present as a whole different shapes. In the non-limiting example represented, the bottom 6 is plane or substantially plane, but in other embodiments the bottom may be shaped like a concave dome, with the concavity of the dome facing the outside of the capsule 1. Also in this case, the choice of this shape is not imperative in so far as the capsule 1 could, for example, have a bottom wall 6 shape like a dome with concavity facing the inside of the capsule 1, or again a variously shaped bottom.

In general, it is preferable for the end wall with larger area, here represented by the wall 5, to constitute the inlet side for the purposes of introduction of pressurized water and/or steam into the capsule 1, whereas the end wall with smaller area, here represented by the wall 6, forms the outlet side for delivery of the beverage from the capsule 1.

The capsule 1, and hence a corresponding coffee machine, may be designed so that tearing or perforation of the outlet side (wall 6) can be brought about following upon introduction of water and/or steam under pressure into the capsule 1 through the inlet side (wall 5). Alternatively, tearing or perforation of the outlet side may occur in cold conditions, following upon an action of perforation by one or more tips of a perforating device associated to the capsule-holder of the brewing unit of the coffee machine; the aforesaid tearing or perforation can occur before, during, or after tearing or perforation of the inlet side by one or more tips of an upper perforating device, associated to the injector of the brewing unit, also before inflow of water and/or steam into the capsule 1 is brought about.

As has been said, the chamber 2 of the capsule 1, which is designed to contain the precursor, has a volume comprised between 15 cm$^3$ and 30 cm$^3$, preferably between 17.20 cm$^3$ and 26.90 cm$^3$. The characteristics of the precursor of the beverage that will be described hereinafter are understood as referring to the case of a chamber 2 included in these dimensions. Moreover, as already mentioned, the precursor comprises roast and ground coffee and soluble coffee. Preferentially, the capsule according to the invention contains only the aforesaid two substances, in a total amount not greater than 12 g, very preferably not greater than 10 g.

According to one aspect of the invention, if the total weight of the precursor corresponds to 100%, at least 51%—preferably at least 56%, very preferably at least 60%—is represented by roast and ground coffee, and the complement to 100% is represented by soluble coffee. In various embodiments, the total weight of the precursor is comprised between 5 g and 12 g, very preferably between 7 g and 10 g, of which a weight of between 4 g and 8.5 g is represented by roast and ground coffee, and a weight of between 1 g and 3.5 g is represented by soluble coffee.

Figure 5:
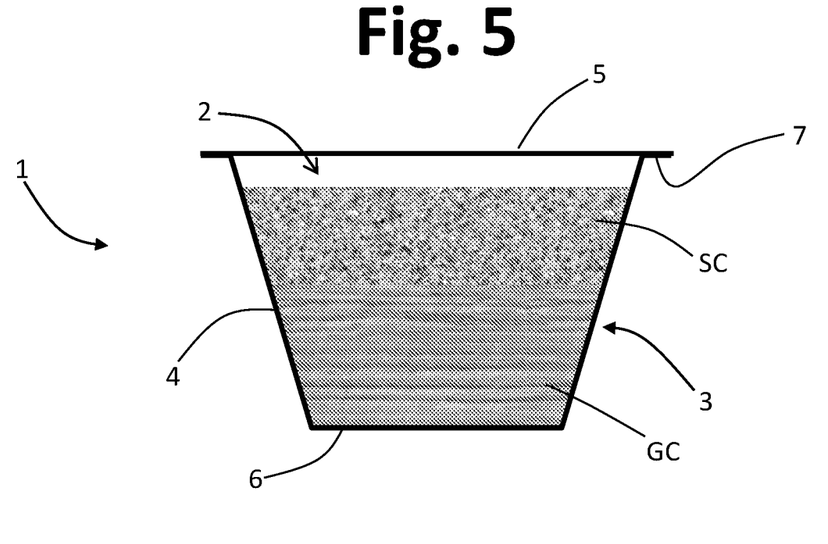
FIG. 5 is a schematic cross-sectional view of a capsule according to first possible embodiments of the invention.

With reference also to FIG. 5, the two components of the precursor are arranged in two layers, namely, a layer of roast and ground coffee GC and a layer of soluble coffee SC.

According to another aspect of the invention, the layer of roast and ground coffee GC is set in a position corresponding to the outlet side of the capsule 1, i.e., in the lower part of the chamber 2, whereas the layer of soluble coffee SC is set in a position corresponding to the inlet side of the capsule 1, i.e., in the upper part of the chamber 2, or in any case above the layer GC.

Figure 3:
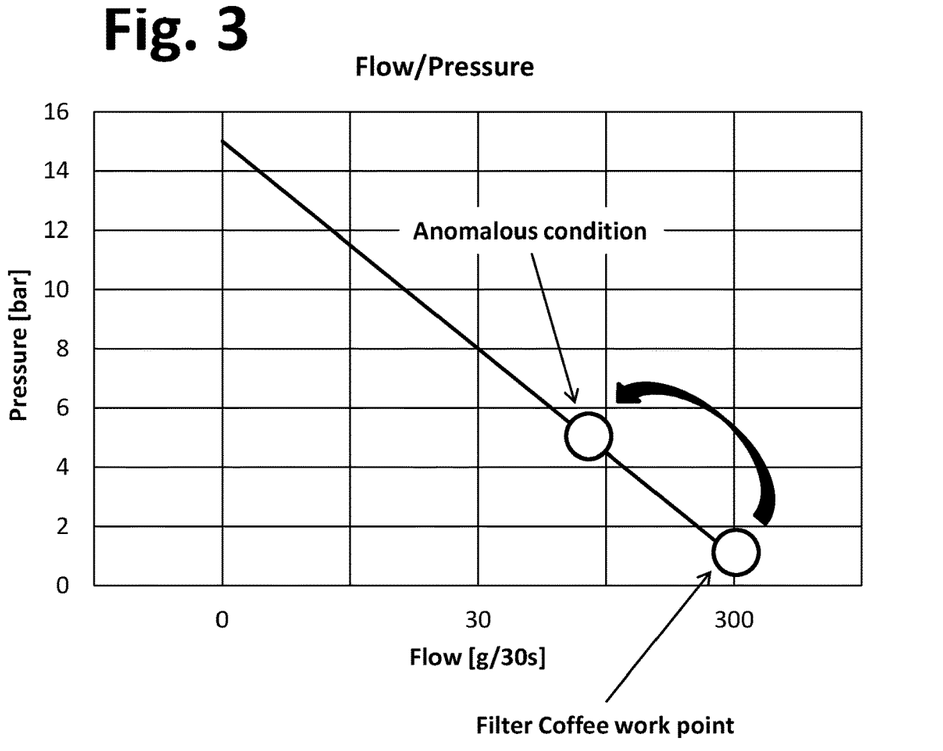
FIG. 3 is a graph similar to that what of FIG. 1, highlighted in which are an expected operating condition and an anomalous operating condition in the case of preparation of a beverage of a filter-coffee type.

Following upon the experimental analyses mentioned in the introductory part of the present description, the inventors have surprisingly noted that, in the case of mixing between the two aforesaid components of the precursor, the soluble coffee—instead of dissolving in order first (given that it presents a higher potential of solubility) and leaving the second part of the extraction process to the ground coffee—tended to dissolve in an antagonistic way together with the ground coffee, thereby contributing to causing an increase in pressure and a reduction in flow (thus shifting the work point of the pump, as explained in relation to FIG. 3).

According to one aspect of the invention, the above problem is partially reduced by the particular location of the two components of the precursor, which are arranged in layers, with the layer SC closer to the side for inlet of water into the capsule 1, and the layer GC closer to the side for outlet of the beverage: in this way, an orderly reaction is enables, i.e., first of the soluble coffee and then of the roast and ground coffee, in particular at extraction pressures at least equal to, or greater than 4 bar.

The repeatability of this correct sequence of solubilisation and extraction of the coffee is further increased, according to an additional aspect of the invention, by rendering the layer GC more densified or compact or pressed as compared to the layer SC, considering these layers in their dehydrated condition, i.e., before water under pressure is let into the capsule. For this purpose, preferentially, the coffee of the layer GC is densified in the lower part of the capsule, i.e., towards the outlet side, with a weight-to-volume ratio, expressed in g/cm$^3$, comprised between 0.30 and 0.60, preferably between 0.33 and 0.50, even more preferably between 0.38 and 0.49.

In various embodiments, the layer GC occupies between 64% and 74% of the total volume of the chamber 2, preferably between 65% and 72%, and even more preferably between 68% and 69%.

It is, instead, preferable for the coffee of the layer SC not to be substantially densified or pressed inside the capsule body. In addition to favouring the orderly reaction referred to above, densification of the layer GC makes it possible to provide above it a free space designed to be occupied by the soluble coffee of the layer SC. Densification also enables the ground coffee of the layer GC to fill the volume reserved thereto completely, without presenting insufficient compactness that might cause non-optimal brewing.

According to a further aspect of the invention, the problem previously referred to is further reduced thanks to the fact that the mean size of the particles of the layer of soluble coffee SC is larger than the mean size of the particles of the layer GC of roast and ground coffee.

In this general framework, it is preferable for the grain-size or particle-size distribution of the layer GC to have a median, evaluated in x50 (according to the ISO guidelines), comprised between 350 μm and 800 μm. On the other side, the grain size expressed in x50 of the coffee of the layer SC is preferably comprised between 1000 and 5000 μm, more preferably between 2000 and 4000 μm, and even more preferably between 3000 and 4000 μm. As may be noted, preferentially, the mean size of the granules of the soluble coffee is decidedly larger than the mean size of the granules of the roast and ground coffee.

The two layers GC and SC can be set directly on top of one another, as represented schematically in FIG. 5. In preferential embodiments, however, the two layers may be kept distinct from one another by means of a porous separating partition, i.e., a water-permeable partition, such as the one designated by 10 in FIG. 6. As may be seen also in FIG. 7, the presence of such a partition divides the chamber 2 into a lower sub-chamber 2' and an upper sub-chamber 2", in which the two layers GC and SC, respectively, are located.

Figure 6:
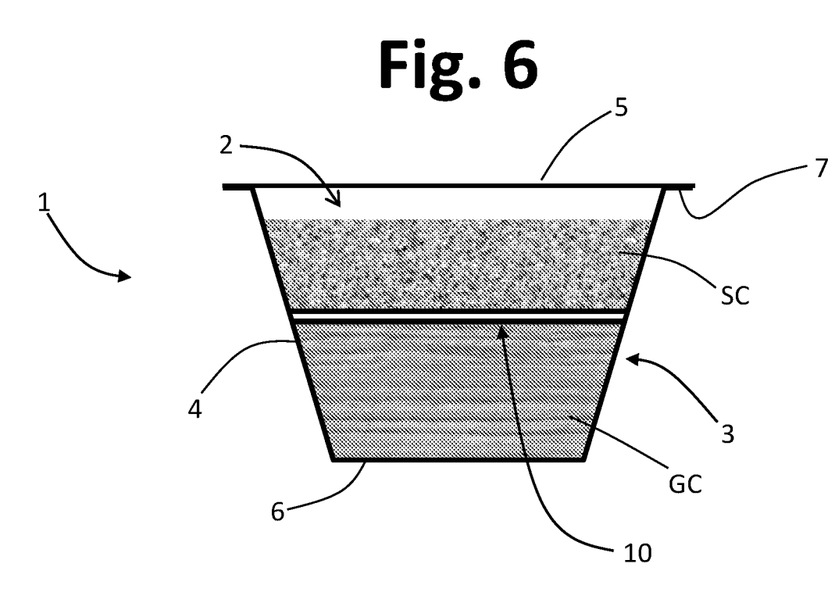
FIG. 6 is a schematic cross-sectional view of a capsule according to second possible embodiments of the invention.

The partition 10 set between the two layers GC and SC prevents contact or mixing between the two types of coffee, further increasing the correct sequence of solubilisation and extraction of the substances. This effect of separation is particularly useful also in the course of the steps that precede preparation of the beverage, and especially during handling of the capsules that occurs for logistic purposes (for example, in the course of their packaging in boxes, their displacement in warehousing environments, their transport to the sales points, their shelving in the sales points, etc.).

The partition 10 may possibly contribute to keeping the coffee of the layer GC in its densified or pressed condition.

As has been said, the separating partition 10 is porous or in any case water-permeable, and may, for example, be configured as an injection-moulded element, or else as a sheet of porous paper, or as a sheet of non-woven fabric. Preferable plastic materials are polypropylene (PP), polyethylene (PE), or polyethylene terephthalate (PET). The partition 10 is of course moulded or blanked from a sheet in the shape suitable for it to be inserted in the chamber 2 of the capsule 1.

The partition can be welded or snap-fitted into the body 3, or else simply rested on the lower layer GC of roast and ground coffee.

Figure 7:
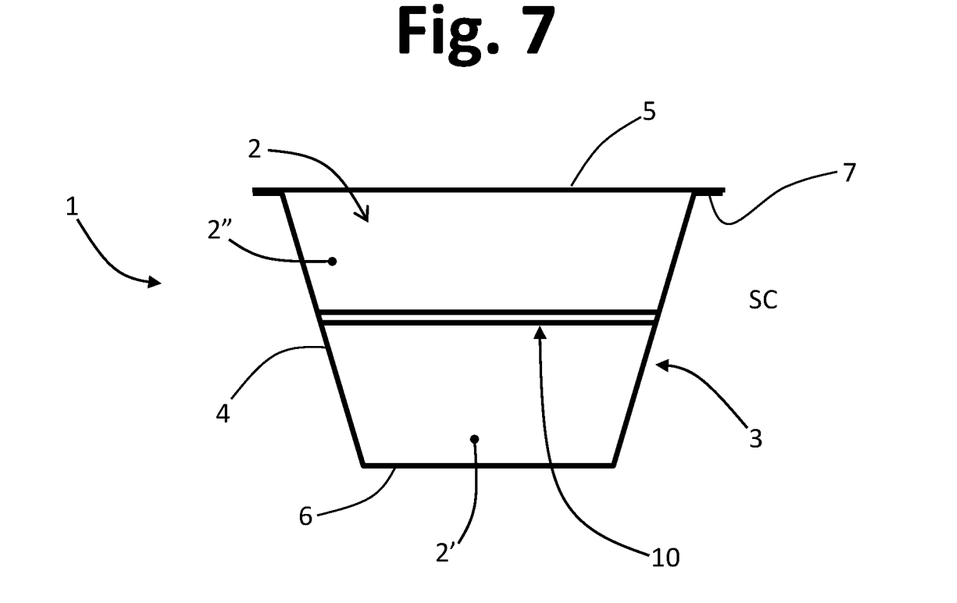
FIG. 7 is a view similar to that of FIG. 6, with the corresponding capsule without any contents.
Figure 8:
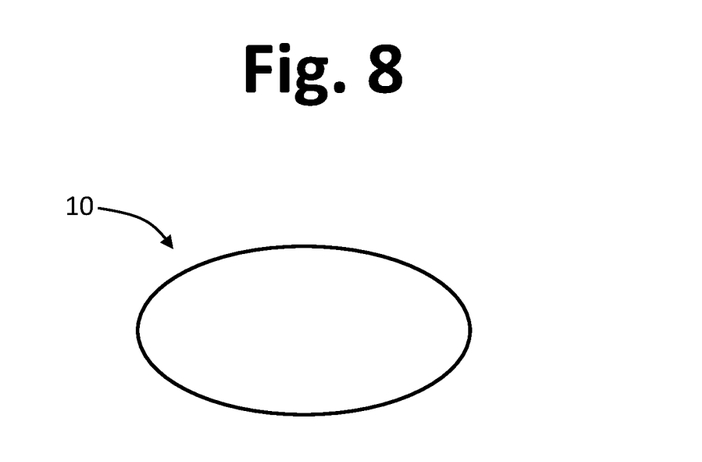
FIG. 8 is a schematic perspective view of a separating diaphragm that can be used in capsules according to possible embodiments of the invention.

In the case represented in FIGS. 6 and 7, a separating partition 10 is used that is shaped like a flat disk, as in FIG.

8, and can be obtained, for example, via dinking from a sheet of permeable material, for example, a sheet of porous paper or a sheet of non-woven fabric. In such a configuration, for example, the partition 10 may be interference-fitted, even with slight deformation, against the wall 4 of the body 3, or else simply rested on the layer GC.

The separating partition could, however, have a shape different from the one exemplified in FIG. 8.

Practical tests conducted by the present Applicant have made it possible to ascertain how the capsules according to the invention enable the desired effects to be obtained, both in terms of reliability in the course of preparation and in terms of levels of quality and taste of the beverage.

Following upon their packaging, the capsules that have undergone testing were subjected to mechanical stress by imparting 30 rotations through 180° on a container having dimensions of 41 cm×37 cm×35 cm containing 100 capsules. The bodies of the capsules treated were similar to those of three types of capsules already currently marketed by the present Applicant, namely, capsules commercially known as "A Modo Mio", "Firma" and "Blue", distinguished by containment volumes of approximately 17.3 cm$^3$, 20.6 cm$^3$, and 26.8 cm$^3$, respectively.

The capsules in question, which contain the beverage precursor as mentioned, were subjected to brewing using coffee machines "Minù", "LF400", and "LB2317", marketed by the present Applicant, respectively for the aforesaid series of capsules "A Modo Mio", "Firma", and "Blue", and conceived from the design standpoint for managing the respective "extremes" referred to previously, represented by capsules for the preparation of espresso coffee and capsules for the preparation of soluble tea. The table below highlights, for each of the three types of capsules used, the volume V1 occupied by the layer GC.

TABLE 2

| Total volume of capsule (cm$^3$) | Volume V1 (cm$^3$) |
|---|---|
| 17.3 | 11.9 ± 0.5 |
| 20.6 | 14.1 ± 0.5 |
| 26.8 | 18.4 ± 0.5 |

Test 1

The capsules having a volume of 26.8 cm$^3$ contained 1.5 g of soluble coffee, with x50 equal to 3000 μm, and 7 g of roast and ground coffee, with x50 equal to 450 μm. The two components were mixed together, and hence the separating partition was not present. One hundred (100) of these capsules were subjected to brewing using LB2317 machines. In 20% of the cases, there were found anomalous conditions of brewing of the type referred to with reference to FIG. 3 discussed previously, which were deemed unacceptable.

Test 2

The capsules having a volume of 26.8 cm$^3$ contained an upper layer of 1.5 g of soluble coffee, with x50 equal to 3000 μm, and a lower layer of 7 g of roast and ground coffee, with x50 equal to 800 μm. The two layers were set on top of one another in the absence of a separating partition (as appears in FIG. 5). One hundred (100) of these capsules were subjected to brewing using LB2317 machines. No anomalous conditions were found, and all the brewing results were deemed acceptable.

Test 3

The capsules having a volume of 20.6 cm$^3$ contained an upper layer of 1.5 g of soluble coffee, with x50 equal to 3000 μm, and a lower layer of 7 g of roast and ground coffee, with x50 equal to 450 μm. The two layers were set on top of one another in the absence of a separating partition (as appears in FIG. 5). One hundred (100) of these capsules were subjected to brewing using LF400 machines. No anomalous conditions were found, and all the brewing results were deemed acceptable.

Test 4

The capsules having a volume of 17.3 cm$^3$ contained an upper layer of 1.5 g of soluble coffee, with x50 equal to 3000 μm, and a lower layer of 5.5 g of roast and ground coffee, with x50 equal to 450 μm. The two layers were set on top of one another in the absence of a separating partition (as appears in FIG. 5). One hundred (100) of these capsules were subjected to brewing using Minn machines. No anomalous conditions were found, and all the brewing results were deemed acceptable.

Test 5

The capsules having a volume of 26.8 cm$^3$ contained an upper layer of 1.5 g of soluble coffee, with x50 equal to 3000 μm, and a lower layer of 7 g of roast and ground coffee, with x50 equal to 450 μm. The two layers were set on top of one another in the presence of a separating partition (as appears in FIG. 6). One hundred (100) of these capsules were subjected to brewing using LB2317 machines. No anomalous conditions were found, and all the brewing results were deemed acceptable.

Test 6

The capsules having a volume of 26.8 cm$^3$ contained an upper layer of 1.5 g of soluble coffee, with x50 equal to 3000 μm, and a lower layer of 8 g of roast and ground coffee, with x50 equal to 450 μm. The two layers were set on top of one another in the absence of a separating partition (as appears in FIG. 5). One hundred (100) of these capsules were subjected to brewing using LB2317 machines. No anomalous conditions were found, and all the brewing results were deemed acceptable.

From the results of Test 1 it emerges how mixing between the two components of the precursor determines a high incidence of situations of anomalous brewing. Instead, all the other tests show how the capsules according to the invention enable solution of this problem, at the same time guaranteeing a satisfactory quality of the beverage obtained.

Figure 9:
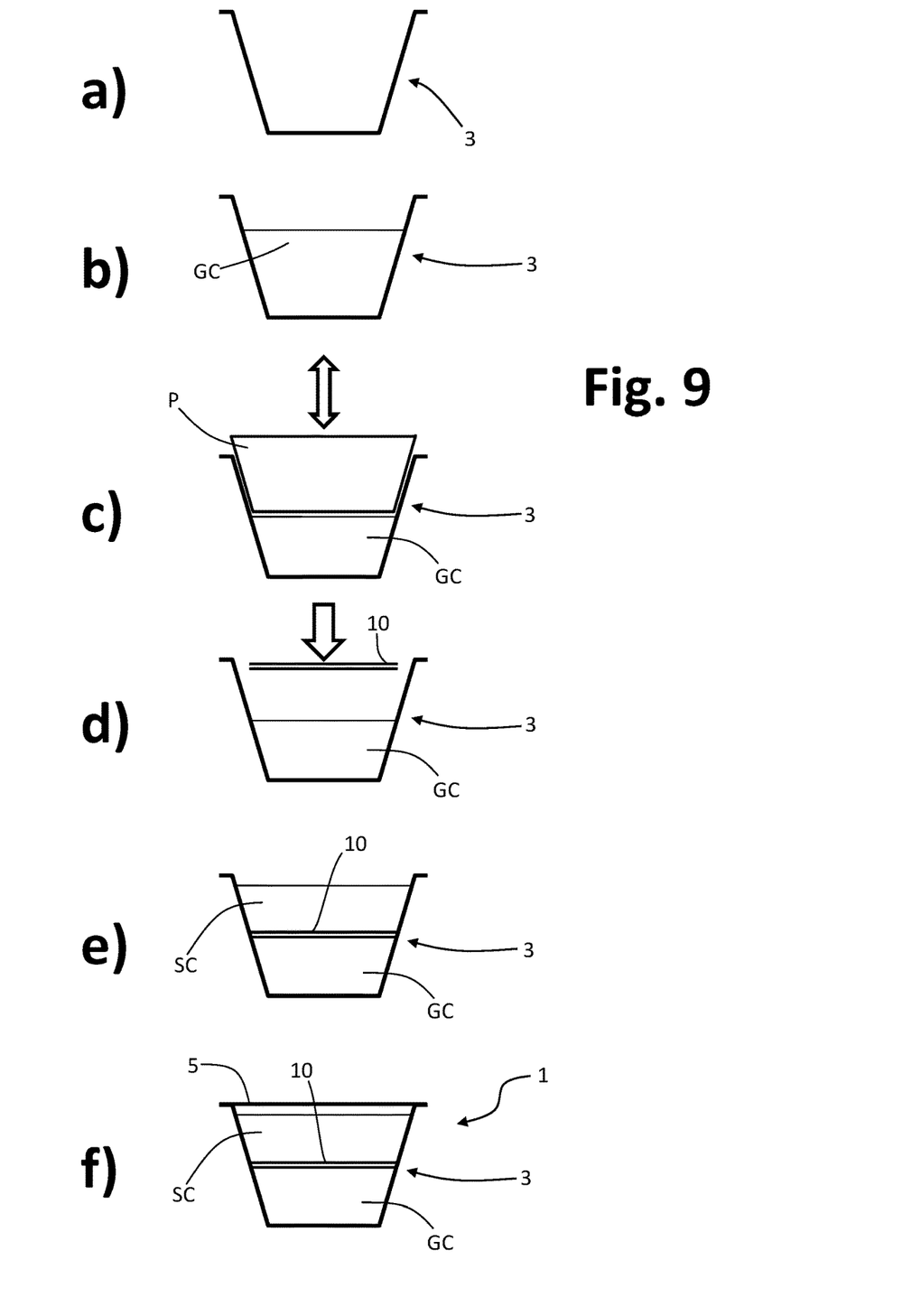
FIG. 9 is a schematic representation of a sequence of operations of a method for the production of a capsule according to possible embodiments of the invention.

FIG. 9 exemplifies a possible sequence for producing a capsule according to the invention. After the body 3 has been obtained, for example, via moulding or thermoforming, as in part a) of FIG. 9, introduced into the body 3 is the dosed amount of roast and ground coffee that is to constitute the layer GC, as emerges from part b) of the figure. Part c) of the figure exemplifies the next step, where, via a mechanical-pressing member, the layer GC is densified within the body 3: in this way, the volume originally occupied by the ground coffee of the layer GC is reduced. In various embodiments, the pressing member is introduced into the body 3 at least up to 50% of the overall height of the body itself (understood as distance between the bottom wall 6 and the flange 7, as emerges from FIG. 4).

Part d) of FIG. 9 exemplifies the next optional step of positioning of the partition 10 inside the body 3, above the layer GC, which is followed by introduction of the dosed amount of soluble coffee that is to constitute the layer GC, as emerges from part e) of FIG. 9. The process ends with apposition of the upper sealing wall or foil 5, which is, for example, heat-sealed to the flange 7 of the body 3. Possibly, the sealing operation can be performed so as to produce a vacuum within the capsule 1, or else introducing therein an inert gas (for example, $N_2$ or $N_2O$ or $CO_2$), in particular for preserving the precursor over time.

It should be noted that the steps c) and d) of pressing of the layer GC and of positioning of the partition 10 can be carried out in a reverse sequence (i.e., first positioning the diaphragm and then pressing the diaphragm and the layer GC downwards), or else be replaced by a single operation, for example equipping the pressing member P so that the latter brings the partition 10 into the body 3 and releases it on the layer GC at the end of pressing thereof.

Figure 10:
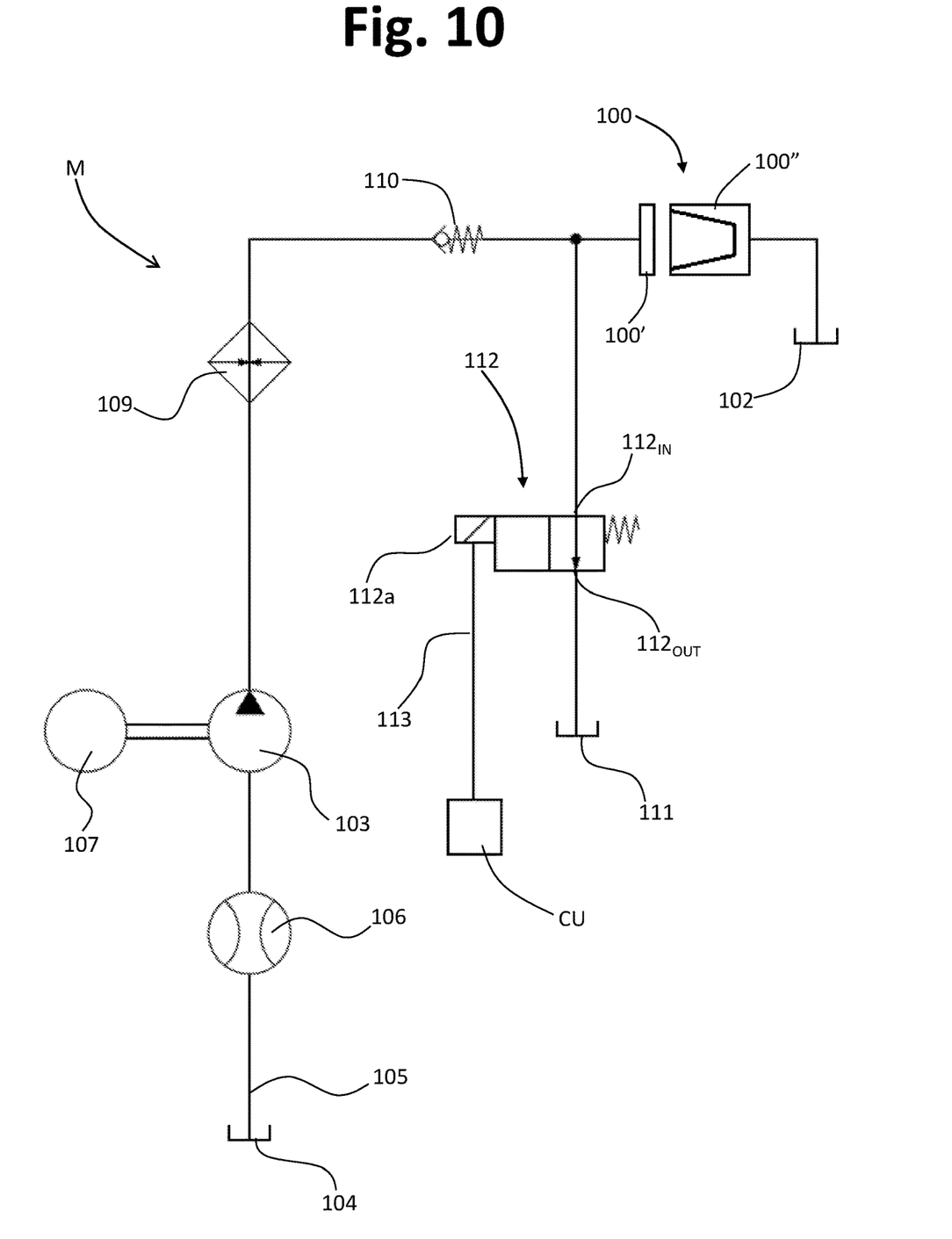
FIG. 10 is a schematic representation of a machine for the preparation of beverages suitable for the use of capsules according to the invention.

Represented schematically in FIG. 10 is a coffee machine that can be used in a system according to the invention. The machine, designated as a whole by M, has a hydraulic circuit including a brewing unit 100 (which from the hydraulic standpoint is substantially equivalent to a flow restrictor), which is configured for delivering a beverage into a container 102 for collection thereof, such as a cup or the like.

In various embodiments, the unit 100 comprises two parts, of which at least one is movable with respect to the other, in particular an injector 100' and a capsule-holder 100", with the latter that defines a fixed-volume housing, designed to receive at least partially a capsule 1. The housing referred to preferentially has a volume of not greater than 30 $cm^3$.

At least one of the injector 100' and the capsule-holder 100" is movable, so that the two parts can be brought into a position of loading or opening, where the capsule 1 can reach the aforesaid housing, and a position of closing or delivery, where the two parts of the unit 100 define a brewing chamber, contained in which is the capsule 1 that can be traversed by a flow of water. For this purpose, in various embodiments, at least one of the two parts of the unit may include one or more opening elements (for example, in the form of tips) for causing tearing or perforation of at least one of the two end walls 5 and 6 of the capsule 1.

The machine M comprises an electric pump 103, which is able to force the water necessary for preparation of a beverage towards the unit 100 at a pressure of at least 4 bar or higher. The pump 103 has the inlet connected to a water reservoir 104 via an intake duct 105, on which there can be interposed a flowmeter 106, for example of the turbine type, in order to supply electrical signals (pulses) representing the flow of water drawn in by the pump 103. The pump 103 may be an electric vibration pump, or else a pump driven by an electric motor 107.

The pressurized water emitted at outlet from the pump 103 reaches an electric heater device or boiler 109, and from there proceeds towards the brewing unit 100. Preferably, set between the heater device 109 and the brewing unit 100 is at least one normally closed unidirectional hydraulic valve 110, designed to enable a flow of water towards the brewing unit 100 when the pressure of the water coming from the pump 103 exceeds a pre-set threshold value of, for example, 2 bar.

In various embodiments, the machine may be provided with an exhaust valve, designated by 112, for example a two-way two-position valve, preferably having an inlet $12_{IN}$ connected between the outlet of the unidirectional valve 110 and the inlet of the brewing unit 100, and an outlet $12_{OUT}$ connected to a drain-off container 111, such as a drip tray. In various embodiments, the valve 112 is a solenoid valve that comprises an excitation solenoid 12$a$, connected to a control unit CU of the machine M via an appropriate electrical line 113. In other embodiments, instead, the valve 112 is a hydraulically driven valve, and the circuit is modified accordingly.

The capsule according to the invention may be without internal filter elements on its outlet side, as in the cases so far exemplified. This is possible when the perforating device associated to the part of the brewing unit designed to perforate the aforesaid wall (typically, the perforating device associated to a capsule-holder 100") is pre-arranged for preventing passage on the outside of the capsule of particles of insoluble coffee in the course of delivery of the beverage. However, in other embodiments, within the chamber 2, between the layer of coffee GC and the outlet wall 6 that is designed for perforation or tearing, there may be set at least one filter element in order to prevent the aforesaid outlet of insoluble particles.

From the foregoing description the characteristics of the present invention emerge clearly, as likewise do its advantages. It is clear that numerous variations may be made by the person skilled in the art to the capsule described by way of example, without thereby departing from the scope of the invention, as defined in the ensuing claims. It is pointed out, for example, that the capsule according to the invention may also have at least one of its end walls—such as the lower wall or bottom—provided with one or more pre-formed passages and/or may include a water-permeable wall (for example, made of filter paper or a non-woven fabric), which are/is also closed by a film designed to tear once a given pressure of water and/or steam is reached within the capsule itself.

The invention claimed is:

1. A capsule for extraction of a coffee-based beverage, having a capsule body made of a water-impervious material, the capsule body defining a chamber, within which is a precursor of the beverage, that comprises soluble coffee and roast and ground coffee, the capsule body being configured so as to have an inlet wall, for introduction of pressurized water into the capsule body, and an outlet wall, for outflow of the beverage from the capsule body, wherein at least 51 wt % of the precursor is roast and ground coffee having a grain size expressed in x50 comprised between 350 and 800 μm, wherein a complement to 100 wt % of the precursor is soluble coffee having a grain size expressed in x50 comprised between 1000 and 5000 μm, wherein the roast and ground coffee is laid out to form a first layer in a lower part of the capsule body, the lower part being in a position corresponding to the outlet wall, and the soluble coffee is laid out to form a second layer in an upper part of the capsule body, the upper part being in a position corresponding to the inlet wall and/or above the first layer, wherein the first layer of roast and ground coffee is densified, or pressed, within the capsule body, and the second layer of soluble coffee is within the capsule body substantially undensified or unpressed, and wherein the first layer of roast and ground coffee is densified with a weight-to-volume ratio expressed in $g/cm^3$ that is comprised between 0.30 and 0.60.

2. The capsule according to claim 1, wherein the chamber of the capsule body has a volume comprised between 15 $cm^3$ and 30 $cm^3$.

3. A capsule for extraction of a coffee-based beverage, having a capsule body made of a water-impervious material, the capsule body defining a chamber, within which is a precursor of the beverage, that comprises soluble coffee and roast and ground coffee, the capsule body being configured so as to have an inlet wall, for introduction of pressurized water into the capsule body, and an outlet wall, for outflow of the beverage from the capsule body, wherein at least 51 wt % of the precursor is roast and ground coffee having a grain size expressed in x50 comprised between 350 and 800 µm, wherein a complement to 100 wt % of the precursor is soluble coffee having a grain size expressed in x50 comprised between 1000 and 5000 µm, wherein the roast and ground coffee is laid out to form a first layer in a lower part of the capsule body, the lower part being in a position corresponding to the outlet wall, and the soluble coffee is laid out to form a second layer in an upper part of the capsule body, the upper part being in a position corresponding to the inlet wall and/or above the first layer, wherein the first layer of roast and ground coffee is densified, or pressed, within the capsule body, and the second layer of soluble coffee is within the capsule body substantially undensified or unpressed, and wherein the first layer of roast and ground coffee occupies between 64% and 74% of the total volume of the chamber of the capsule body.

4. The capsule according to claim 1, wherein the total weight of the precursor is not higher than 12 g.

5. A capsule for extraction of a coffee-based beverage, having a capsule body made of a water-impervious material, the capsule body defining a chamber, within which is a precursor of the beverage, that comprises soluble coffee and roast and ground coffee, the capsule body being configured so as to have an inlet wall, for introduction of pressurized water into the capsule body, and an outlet wall, for outflow of the beverage from the capsule body, wherein at least 51 wt % of the precursor is roast and ground coffee having a grain size expressed in x50 comprised between 350 and 800 µm, wherein a complement to 100 wt % of the precursor is soluble coffee having a grain size expressed in x50 comprised between 1000 and 5000 µm, wherein the roast and ground coffee is laid out to form a first layer in a lower part of the capsule body, the lower part being in a position corresponding to the outlet wall, and the soluble coffee is laid out to form a second layer in an upper part of the capsule body, the upper part being in a position corresponding to the inlet wall and/or above the first layer, wherein the first layer of roast and ground coffee is densified, or pressed, within the capsule body, and the second layer of soluble coffee is within the capsule body substantially undensified or unpressed, wherein the total weight of the precursor is comprised between 5 g and 12 g, wherein:
the first layer of roast and ground coffee comprises between 5 g and 8.5 g of roast and ground coffee; and
the second layer of soluble coffee comprises between 1 g and 3.5 g of soluble coffee.

6. The capsule according to claim 1, wherein set between the first layer of roast and ground coffee and the second layer of soluble coffee is a water-permeable separating partition.

7. A method for obtaining a capsule for preparation of a coffee-based beverage according to claim 1, comprising the steps of:

a) providing the capsule body that defines the chamber designed to receive the precursor of the beverage and having the outlet wall for outflow of the beverage from the capsule;

b) introducing into the chamber the beverage precursor in powder form, which includes soluble coffee powder and roast and ground coffee powder; and c) providing the capsule body with the inlet wall for introduction of water into the capsule, wherein step b) comprises the operations of:

b1) introducing into the chamber an amount of roast and ground coffee powder having a grain size expressed in x50 comprised between 350 and 800 µm, to form a lower layer;

b2) densifying the roast and ground coffee powder of the lower layer via mechanical pressing; and b3) introducing into the chamber an amount of soluble coffee powder having a grain size expressed in x50 comprised between 1000 and 5000 µm, to form an upper layer without mechanical pressing, wherein the roast and ground coffee powder of the lower layer forms at least 51 wt % of the precursor in powder form, and the soluble coffee powder of the upper layer forms a complement to 100 wt % of the precursor in powder form.

8. The method according to claim 7, wherein operation b2) comprises densifying the roast and ground coffee powder with a weight-to-volume ratio expressed in $g/cm^3$ that is comprised between 0.30 and 0.60, or between 0.33 and 0.50, or between 0.38 and 0.49.

9. The method according to claim 7, wherein:
step a) comprises providing a capsule body with a chamber having a total volume comprised between 15 and 30 $cm^3$, or between 17.20 $cm^3$ and 26.90 $cm^3$;
operation b1) comprises introducing into the chamber an amount of roast and ground coffee powder comprised between 5 g and 8.5 g; and
operation b2) comprises densifying the roast and ground coffee powder in a volume comprised between 64% and 74% of the total volume of the chamber, or between 65% and 72%, or between 68% and 69%.

10. The method according to claim 7, wherein set between the lower layer and the upper layer is a water-permeable separating partition.

11. A system for preparation of coffee-based beverages, comprising:
a capsule according to claim 1; and
a machine for preparation of beverages having a hydraulic circuit that comprises a pump, a water-heating device and a brewing unit, wherein the pump is configured for forcing water towards the brewing unit at a pressure of at least 4 bar.

12. The capsule according to claim 1, wherein the roast and ground coffee is in powder for and the soluble coffee is in powder form.

13. The capsule according to claim 1, wherein the first layer of roast and ground coffee is densified with a weight-to-volume ratio expressed in $g/cm^3$ that is comprised between 0.33 and 0.50.

14. The capsule according to claim 2, wherein the chamber of the capsule body has a volume comprised between 17.20 $cm^3$ and 26.90 $cm^3$.

15. The capsule according to claim 14, wherein the first layer of roast and ground coffee occupies between 65% and 72% of the total volume of the chamber of the capsule body.

16. The capsule according to claim 4, wherein the total weight of the precursor is not higher than 10 g.

17. The capsule according to claim 4, wherein the total weight of the precursor is comprised between 7 g and 10 g.

18. A capsule for extraction of a coffee-based beverage, having a capsule body made of a water-impervious material, the capsule body defining a chamber having volume comprised between 15 $cm^3$ and 30 $cm^3$, within which is precursor in powder form of the beverage that comprises soluble coffee powder and roast and ground coffee powder, the capsule body having an upper part which comprises an inlet wall, for introduction of pressurized water into the capsule body, and a lower part which includes an outlet wall, for outflow of the beverage from the capsule body, wherein at least 51 wt % of the precursor is roast and ground coffee powder having a grain size expressed in x50 comprised between 350 and 800 μm, wherein a complement to 100 wt % of the precursor is soluble coffee powder having a grain size expressed in x50 comprised between 1000 and 5000 μm, wherein the roast and ground coffee powder is laid out to form a first layer in the lower part of the capsule body, and the soluble coffee powder is laid out to form a second layer in the upper part of the capsule body, wherein the first layer of roast and ground coffee powder is densified, or pressed, within the capsule body with a weight-to-volume ratio expressed in $g/cm^3$ that is comprised between 0.30 and 0.60, and the second layer of soluble coffee powder is within the capsule body substantially undensified or unpressed, and wherein the total weight of the precursor in powder form is comprised between 5 g and 12 g, the first layer comprises between 5 g and 8.5 g of roast and ground coffee powder, and the second layer comprises between 1 g and 3.5 g of soluble coffee powder.

19. The capsule according to claim 1, wherein the first layer of roast and ground coffee is densified with a weight-to-volume ratio expressed in $g/cm^3$ that is comprised between 0.38 and 0.49.

20. The capsule according to claim 14, wherein the first layer of roast and ground coffee occupies between 68% and 69% of the total volume of the chamber of the capsule body.

* * * * *